United States Patent

Freudenschuss

[15] 3,637,125

[45] Jan. 25, 1972

[54] INTERMITTENT DRIVE MECHANISM FOR A CINEMATOGRAPHIC APPARATUS

[72] Inventor: Otto Freudenschuss, Vienna, Austria

[73] Assignees: Karl Vockenhuber; Raimund Hauser, both of Vienna, Austria

[22] Filed: Oct. 24, 1969

[21] Appl. No.: 869,291

[30] Foreign Application Priority Data

Oct. 30, 1968 Austria ............................A 10601/68

[52] U.S. Cl. ................................................226/62, 352/194

[51] Int. Cl. ........................................................G03b 1/22

[58] Field of Search .........................352/194, 195, 191, 196; 226/62, 68, 73

[56] References Cited

UNITED STATES PATENTS

| | | | |
|---|---|---|---|
| 3,110,194 | 11/1963 | Roman | 352/195 X |
| 3,463,372 | 8/1969 | Kirn | 226/62 X |
| 3,494,692 | 2/1970 | Woodruff | 226/62 X |

*Primary Examiner*—Richard A. Schacher
*Assistant Examiner*—Gene A. Church
*Attorney*—Ernest G. Montague

[57] ABSTRACT

An intermittent drive means in a cinematographic apparatus adapted to be used with perforated film, wherein the intermittent drive means includes cam means. Claw means are controlled by the cam means and are adapted to transport the film. The claw means are further displaceable perpendicularly to the plane of the film to engage and disengage the perforation holes of the film in synchronism with the film-transporting movement. Biasing means urge the claw means in perforation engaging direction. Electromagnetic means have an energized and a deenergized condition. In the energized condition the electromagnetic means are adapted to hold the claw means in perforation disengaged position against the force of the biasing means. In the perforation engaged position of the claw means the attractive force of the electromagnetic means are smaller than the force of the biasing means. In the perforation disengaged position of the claw means the attractive force of the electromagnetic means are larger than the force of the biasing means.

15 Claims, 3 Drawing Figures

PATENTED JAN 25 1972
3,637,125
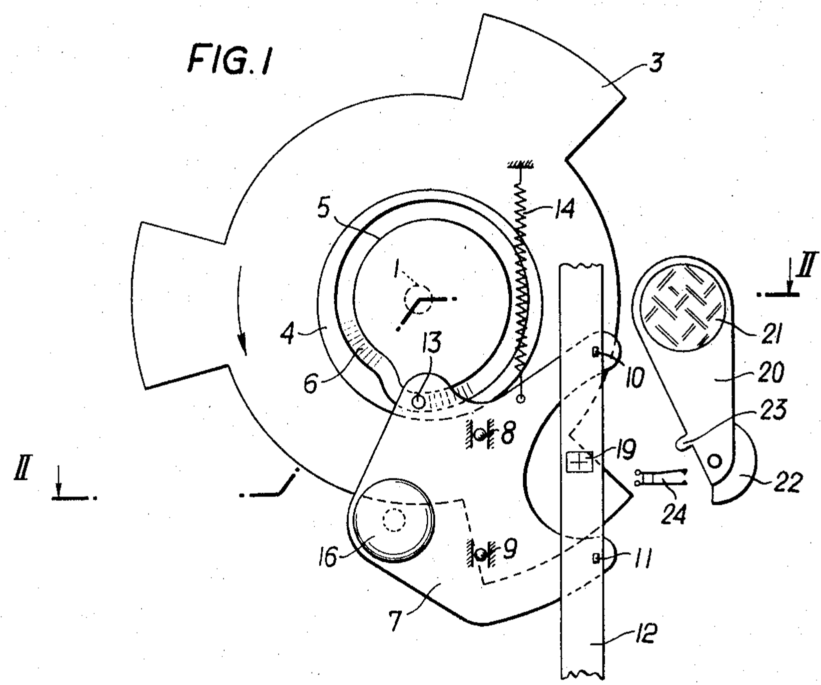
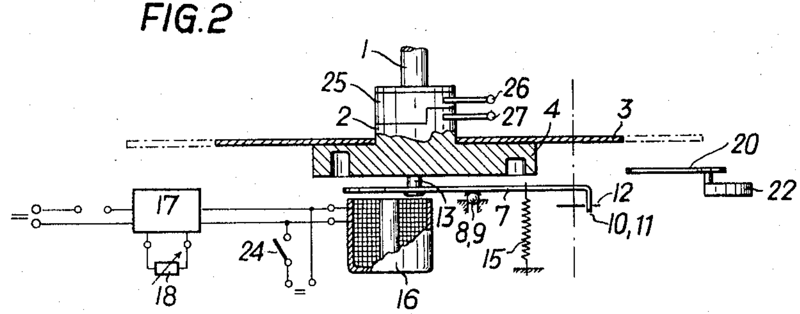
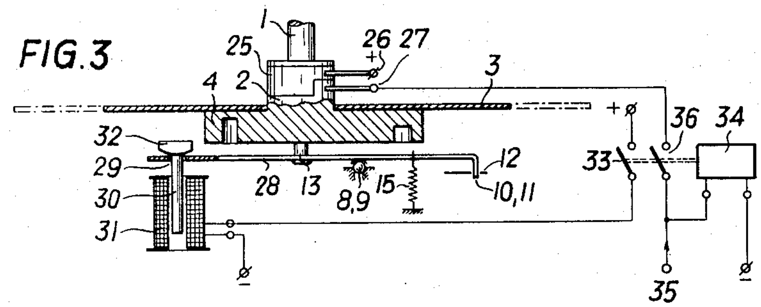
Inventor
Otto Freudensohn
By Arnett & Montague
Attorney

INTERMITTENT DRIVE MECHANISM FOR A CINEMATOGRAPHIC APPARATUS

The invention relates to an intermittent drive mechanism with a claw frame, which is displaceable vertically to the film plane by the film or by a transverse cam against the force of a spring and which engages the perforation of the film with the claw tooth or disengages it respectively in accordance with the transport movement of the claw, whereby means are provided for the suppression of the engaging movement of the claw.

In a known apparatus of the kind described above a cam disk is provided, which is driven by the claw shaft by means of a reducing gear; a displaceable cam follower rests on the cam disk on the one hand and on the other hand props to the claw frame. Various curved tracks are provided on the cam disk, which, in cooperation with the cam follower, cause the claw frame not to engage the film perforation in each transport phase of the claw. Therewith it is possible to omit every second transport phase and to reduce correspondingly the frame frequency of the apparatus. Analogously the frame frequency can be reduced to a third of a quarter a.s.o. of the normal transport velocity. In the known arrangement it has to be avoided that the cam follower abutting the control cam, is displaced during the transport phase of the claw, disengaging therewith the claw from the perforation hole, while the film has not yet been transported by an entire perforation distance. Certain means are necessary, which enable the changeover of the cam follower only in a specific phase position of the driving shaft of the claw. The constructive display resulting thereof is relatively high. A further disadvantage of the known arrangement is that for constructive reasons only few frame frequencies can be provided. Finally the much desired remote control of the apparatus is hardly realizable with a reasonable display.

In order to avoid the last-mentioned difficulty, it has also been suggested to control the transverse movement of the claw by an electromagnet. In the known arrangement there is provided a lever standing under the action of a return spring. Said lever is swingable into an operating position, in which it releases a claw frame, by means of which the claw tooth engages the film perforation under the force of a spring. A disadvantage of the known arrangement is that on the one hand, upon switching-in the magnetic system, the airgap is very large and on the other hand the relatively strong spring force is to be overcome. It is therefore necessary to provide a particularly powerful magnetic system, which however is disadvantageous not only with respect to display, but also with respect to the necessary power supply. In accordance with the apparatus described above, also here an inphase switching-in of a magnetic system is required, so that a control by external impulse generators is excluded.

The scope of the invention is to produce an intermittent drive mechanism, which on the one hand has a small output of the magnetic system and on the other hand is uncritical as to the switching-in moment. This problem is solved according to the invention, in that there is provided an electromagnet, which is in active connection with the claw frame—as already known—and which endeavors to work against the force of a spring upon energization and to retain the claw in disengaged position, whereby the attractive force of the magnet is smaller than the force of the spring, when the claw is engaged, while the attractive force of the magnet is larger than the force of the spring, when the claw is disengaged.

In the novel arrangement the transverse displacement of the claw frame is effected by the claw cam, while the magnetic system has only the task to retain the claw frame is disengaged position. This solution further offers the advantage that the magnetic system need only be dimensioned according to its attractive force, so that the electromagnet can be relatively small and has a small current consumption. In an advantageous embodiment of the invention the armature of the electromagnet is coupled with the claw frame, in particular it is constructed as integrated constituent of the claw frame. The armature lies opposite the poles of the electromagnet thus, that the airgap between the armature and the poles is much larger with engaged claw than with disengaged claw. Especially small masses of the claw frame may be attained, when in another advantageous embodiment of the invention there is arranged a stationary solenoid, the armature of which tensionally effects the claw frame with energized winding and is removed from the claw frame with deenergized winding.

Further features of the invention will become apparent from the following specification of some embodiments and with reference to the drawing.

FIG. 1 shows an intermittent drive mechanism of a substandard format film projector and the parts cooperating with it in front elevation, FIG. 2 illustrates a section along the plane II—II in FIG. 1, FIG. 3 likewise shows a section of another variation of the invention.

In FIGS. 1 and 2 the claw shaft of the apparatus is marked by the number 1. Said claw shaft is driven by a motor in clockwise sense, which is not shown. On the shaft 1 there is arranged a hub 2, which bears a three-bladed shutter 3 and a cam disk 4. The cam disk 4 shows—as already known—a radial curve 5 and an axial curve 6. Opposite the cam disk 4 there is arranged a claw frame 7, which is pivoted on two balls 8 and 9 and is vertically shiftable. The claw frame 7 is provided with two claw teeth 10, 11, which cooperate with the perforation of the film 12 and transport the same in accordance with the movement of the claw frame. On the claw frame 7 there is provided a cam follower 13, which is urged to the cam disk 4 under the force of a spring 14 and a second spring 15. By means of the cam follower 13, the claw frame 7 is moved to and fro in vertical direction corresponding to the course of the radial curve 5, while the axial curve 6 causes a deviation of the claw frame, whereby the claw teeth 10, 11 either engage the perforation of the film 12 or are disengaged from the same. Opposite the claw frame, manufactured of ferromagnetic material, there is located a pot-shaped magnet 16, which is energized by an impulse generator 17. A rheostat 18 indicated on the impulse generator 17 is supposed to indicate schematically an adjustable timing member of the impulse generator. An insulating filter 21 arranged on a lever 20 is retractable between the illuminating system, not illustrated, and the image gate 19. The lever 20 is swingable with the aid of a knurled knob 22 and when it is pivoted in the path of rays closes a switch 24 by means of an extension 23.

The mode of operation of the inventive arrangement is substantially as follows:

As it is well known, the film 12 is transported by the intermittent drive mechanism, when the electromagnet is deenergized. Immediately before the real transport movement of the claw, the claw teeth 10 and 11 engage the perforation of the film by means of the axial curve 6. During the following phase the claw frame is shifted downwards by means of the radial curve 5, whereby the claw teeth 10 and 11 transport the film 12 in the same sense. After termination of the transport lift, the claw frame is deviated by means of the axial curve 6, whereby the claw teeth 10, 11 are disengaged from the perforation of the film 12. In the following the claw frame is led to its initial position b means of the radial cam. If for instance, upon pivoting the insulating filter 21, the switch 24 is closed and the electromagnet 16 is constantly excited, the claw frame is retained by the same in disengaged position. On account of the relatively small output of the magnetic system, the same is not able to disengage the claw frame from its operating position, in which the claw teeth 10, 11 engage the film perforation. Should the magnetic system incidently be switched in in such a phase position, the already commenced transport cycle proceeds undisturbed. If however, following the transport phase the claw is disengaged from the film perforation by means of the axial curve, simultaneously the claw frame serving as armature for the magnet is retained. The claw frame is not allowed to return to its operating position so long as the magnetic system 16 is switched in, so that with up and down swinging claw frame, no film transport takes place. If the magnetic system 16 is not constantly energized, but only during every second transport phase, the film is projected with half-frame frequency. Since the shutter 3 proceeds—as it is known—with undiminished velocity, the bright and dark frequency remains constant, so that flicker is avoided. For the setting of the frame frequency an inphase generator 17 must be provided according to FIG. 2, the impulse duration of which is variable for instance by adjustment of a timing member 18. The impulse generator 17 may be constructed in the form of a relay system or a multivibrator. In order to avoid that the claw frame 7 is released by the electromagnet 16, when the cam follower 13 shows a relatively large distance from the axial curve 6, it may be advantageous to synchronize the impulse generator 17 with respect to the phase position of the impulse end by means of a contact maker 25 to 27 arranged on the hub 2. Therewith it is possible to switch off the magnet 16 in the moment in which the cam follower 13 of the claw frame lies immediately opposite the axial curve 6, so that said cam follower strikes the curve with very little velocity and consequently a formation of noise is avoided.

The variation illustrated in FIG. 3 corresponds, as far as the cam disk 4 and the shutter 3 are concerned, with the embodiment set forth above. In the drawing the corresponding parts are marked by the same reference characters. Deviating from the embodiment described above, the claw frame 28 shows a long hole 29, which is penetrated by the armature 30 of a solenoid 31. The armature 30 of the solenoid props with a shoulder 32 to the claw frame. By the separation of the armature from the claw frame, the latter can be constructed particularly slightly, which is advantageous with regard to the high acceleration occurring at the claw frame. If the solenoid 31 is energized when the claw teeth 10, 11 engage the film perforation, the armature 30 is first attracted only so far, until it joins the claw frame 28. Since the attractive force of the solenoid is not sufficient as to overcome the force of the spring 15, the already commenced transport phase is not interrupted. As soon however as the axial curve 6 deviates the claw frame in counterclockwise sense, the armature 30 is further dragged into the solenoid, whereby the attractive force increases strongly, so that finally the force of the spring 15 is overcome. If the solenoid remains switched in, the claw frame 28 cannot follow the axial curve 6, so that the claw teeth 10, 11 remain disengaged. The solenoid 31 is controlled by the switch 33 of a relay 34, which receives impulses from an in case external impulse generator by means of the contact 35. The relay 34 shows a contact 36 adapted to keep said relay excited and connecting the same with a current source by means of the contact maker 25 to 27 arranged on the claw shaft 1. When the relay 34 is excited by a short impulse, it keeps so long excited by the contact 36, until the transport cycle following the impulse is terminated. Then, by means of the contact maker 25 to 27, the relay 34 and therewith the solenoid 31 is switched off. By this measure it is guaranteed that with each of the impulses fed to the apparatus, no transport step of the intermittent drive occurs. The control can of course also be designed thus that each impulse causes the transport of the film 12 by one frame, while with the impulses failing, the film is not transported. The impulses may be derived from a freely swinging oscillator of which the frequency or impulse duration, respectively, is adjustable. It is also possible to derive the impulses from a distributor, for instance from a sound tape recorder. As it is known from other cases, a pilot track may be provided on the tape besides the recording of the intelligence signal. On said pilot track impulses are recorded. As set forth above, these impulses cause a synchronous transport of the film. It is self-evident that instead of the relay system 33 to 36 also an electronic impulse generator, e.g., a multivibrator can be provided. Instead of the contact maker 25 to 27 also a photoelectric, inductive or similar scanning- and control mechanism may be provided. Within the scope of the invention it is of course also possible to control the magnetic system 16 to 31 immediately by a contact maker, which is arranged on a shaft coupled with the claw shaft 1 by means of a reduction gear.

The invention is not limited in its application to intermittent drive mechanisms, the transverse movement of which is controlled by cams. Within the scope of the invention it is also possible to equip so-called latch claws (being spring-urged towards the film) with corresponding magnetic systems, in order to prevent the engaging movement of the claw tooth in the perforation. The invention is to be applied with special advantage to sprocketless apparatus. In apparatus provided with sprockets simultaneously with the adjustment of the transport frequency of the claw, also the rate of revolutions of the sprocket has to be adapted.

What is claimed is:

1. Intermittent drive means in a cinematographic apparatus adapted to be used with perforated film, said intermittent drive means including cam means, claw means controlled by said cam means and being adapted to transport said film, said claw means further being displaceable perpendicularly to the plane of said film to engage and disengage the perforation holes of said film in synchronism with said film-transporting movement, biasing means urging said claw means in perforation engaging direction, electromagnetic means having an energized and a deenergized condition, in energized condition said electromagnetic means operatively holding said claw means in perforation disengaged position against the force of said biasing means, in perforation engaged position of said claw means the attractive force of said electromagnetic means being smaller than the force of said electromagnetic means being smaller than the force of said biasing means, in perforation disengaged position of said claw means the attractive force of said electromagnetic means being larger than the force of said biasing means.

2. Intermittent drive means according to claim 1, wherein said electromagnetic means comprising stationary solenoid means having armature means, in energized condition of said solenoid means said armature means affecting tensionally said claw means, in deenergized condition of said solenoid means said armature means being removed from said claw means.

3. Intermittent drive means in a cinematographic apparatus adapted to be used with perforated film, said intermittent drive means including cam means, claw supporting means controlled by said cam means to be moved substantially parallelly to the plane of said film and being displaceable perpendicularly to said film plane, claw means fixed on said claw supporting means and adapted to engage and disengage the perforation holes of said film and to transport the same, biasing means connected with said claw supporting means to urge said claw means in perforation engaging direction, electromagnetic means comprising at least one pair of poles and having an energized and a deenergized condition and cooperating with armature means, said armature means being connected with said claw supporting means, in energized condition said electromagnetic means operatively holding said claw means in perforation disengaged position against the force of said biasing means, said armature means being opposed to the poles of said electromagnetic means, thereby at least in deenergized condition of said electromagnetic means an airgap lying therebetween, in perforation engaged position of said claw means said airgap being much larger than in perforation disengaged position of said claw means, whereby in perforation engaged position of said claw means the attractive force of said electromagnetic means being smaller than the force of said biasing means, in perforation disengaged position of said claw means the attractive force of said electromagnetic means being larger than the force of said biasing means.

4. Intermittent drive means according to claim 3, wherein said armature means are constructed integrally with said claw supporting means.

5. Intermittent drive means in a cinematographic apparatus adapted to be used with perforated film, said intermittent drive means including cam means, rotatable shaft means bearing said cam means, claw supporting means controlled by said cam means to be moved substantially parallelly to the plane of said film and being displaceable perpendicularly to said film plane, claw means fixed on said claw supporting means and adapted to engage and disengage the perforation holes of said film and to transport the same, biasing means connected with said claw supporting means to urge said claw means in perforation engaging direction, electromagnetic means having an energized and a deenergized condition, in energized condition said electromagnetic means operatively holding said claw means in perforation disengaged position against the force of said biasing means, first impulse generating means controlling said electromagnetic means and comprising first switch means operated in synchronism with the revolutions of said shaft means, second switch means adapted to be synchronized with said first switch means to be operated thereby to a first switching position, second impulse generating means connected with said second switch means, said second switch means being adapted to be operated by said second impulse generating means to a second switching position, in perforation engaged position of said claw means the attractive force of said electromagnetic means being smaller than the force of said biasing means, in perforation disengaged position of said claw means the attractive force of said electromagnetic means having larger than the force of said biasing means.

6. Intermittent drive means according to claim 5, wherein said second switch means are multivibrator means.

7. Intermittent drive means according to claim 5, wherein in said first switching position of said second switch means said electromagnetic means being deenergized, in said second switching position of said second switch means said electromagnetic means being energized.

8. Intermittent drive means according to claim 5, wherein said impulse generating means further comprise timing means having an adjustable time constant.

9. Intermittent drive means according to claim 8, wherein said timing means are electronic timing means.

10. Intermittent drive means according to claim 5, wherein said second impulse generating means comprise tape recorder means and tape means, said tape means having a pilot track, wherein pilot signals are recorded.

11. Intermittent drive means in a cinematographic apparatus adapted to be used with perforated film, said intermittent drive means including cam means, claw supporting means controlled by said cam means to be moved substantially parallelly to the plane of said film and being displaceable perpendicularly to said film plane, claw means fixed on said claw supporting means and adapted to engage and disengage the perforation holes of said film and to transport the same, biasing means connected with said claw supporting means to urge said claw means in perforation engaging direction, electromagnetic means comprising at least one pair of poles and having an energized and a deenergized condition and cooperating with armature means, said armature means being connected with said claw supporting means, in energized condition said electromagnetic means operatively holding said claw means in perforation disengaged position against the force of said biasing means, said armature means being opposed to the poles of said electromagnetic means, impulse generating means generating impulses of adjustable width, said impulse generating means being synchronized by self-inductance variations of said electromagnetic means, said self-inductance variations being caused by said displacement of said claw supporting means perpendicularly to said film plane, in perforation engaged position of said claw means the attractive force of said electromagnetic means being smaller than the force of said biasing means, in perforation disengaged position of said claw means the attractive force of said electromagnetic means being larger than the force of said biasing means.

12. Intermittent drive means according to claim 11, wherein said impulse generating means are multivibrator means.

13. Intermittent drive means according to claim 11, wherein said impulse generating means further comprise timing means having an adjustable time constant.

14. Intermittent drive means according to claim 11, wherein said timing means are electronic timing means.

15. Intermittent drive means according to claim 11, wherein said impulse generating means comprise tape recorder means and tape means, said tape means having a pilot track, wherein pilot signals are recorded.

* * * * *